Sept. 2, 1958          D. M. GURNEY          2,850,715
CONTACT AND BEARING ASSEMBLY Filed Sept. 25, 1956          2 Sheets-Sheet 1

INVENTOR.
DAVID M. GURNEY
BY
ATTORNEY

Sept. 2, 1958      D. M. GURNEY      2,850,715

CONTACT AND BEARING ASSEMBLY

Filed Sept. 25, 1956      2 Sheets-Sheet 2

INVENTOR.
DAVID M. GURNEY
BY D. C. Staley
ATTORNEY

United States Patent Office 2,850,715
Patented Sept. 2, 1958

2,850,715
CONTACT AND BEARING ASSEMBLY

David M. Gurney, Birch Run, Mich., assignor to General Motors Corporation, Detroit, Mich., a corporation of Delaware Application September 25, 1956, Serial No. 611,843

3 Claims. (Cl. 339—258)

This invention relates to steering wheels, and particularly to a contact ring and bearing assembly which supports the steering shaft and provides for conduction of electric current to a horn contact assembly.

An object of the invention is to provide an improved bearing assembly and contact ring that is constructed and arranged to effect complete insulation of a connection between the conductor wire that passes through the steering mast and a contact ring that is engaged by a sliding contact carried on the steering wheel for conduction of electric current to the contact assembly for sounding a horn of a vehicle.

Another object of the invention is to provide an improved bearing assembly and contact ring that has a snap connection between the conductor cable and the contact ring to lock the conductor cable to the contact ring and also provide for complete electric insulation of the conductor from the steering mast.

Further objects and advantages of the present invention will be apparent from the following description, reference being had to the accompanying drawings wherein a preferred form of the invention is clearly shown.

Figure 1:
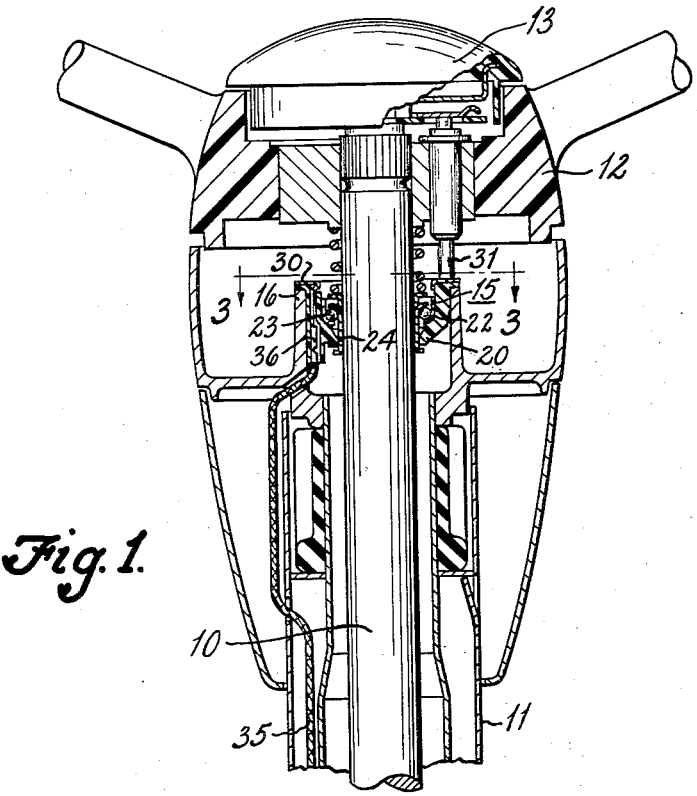
Figure 1 is a cross sectional view of a steering mast including a horn ring incorporating features of this invention.
Figure 2:
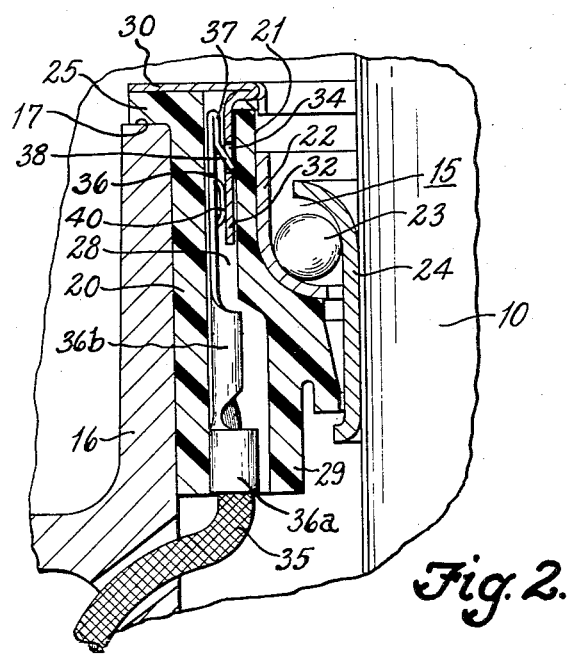
Figure 2 is a cross sectional view taken along line 2—2 of Figure 3.
Figure 3:
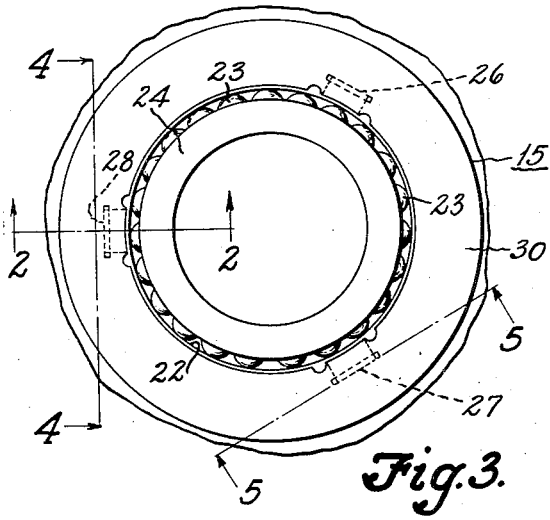
Figure 3 is a cross sectional view taken along line 3—3 of Figure 1.
Figure 6:
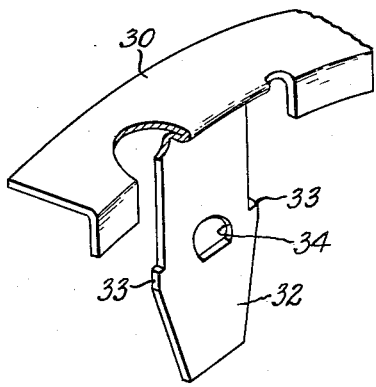
Figure 6 is a perspective elevational view of a part of the contact ring illustrating the attachment tang for the terminal.
Figure 4:
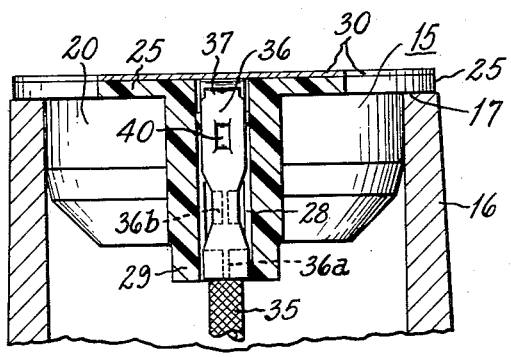
Figure 4 is a cross sectional view taken along line 4—4 of Figure 3.
Figure 7:
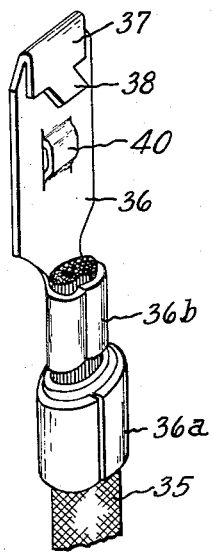
Figure 7 is a perspective elevational view of the terminal adapted for attachment to the tang of Figure 6.
Figure 5:
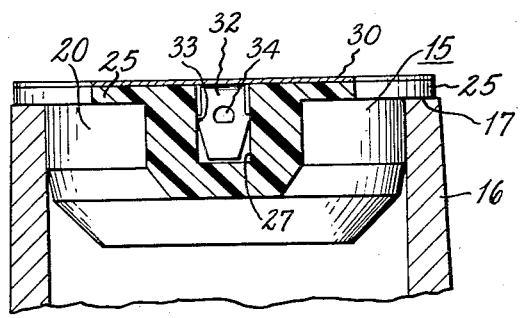
Figure 5 is a cross sectional view taken along line 5—5 of Figure 3.

In this invention the steering assembly consists of a steering shaft 10 that is located within a steering mast 11. The upper end of the steering shaft 10 carries the steering wheel 12 in which there is located a horn button assembly 13 for sounding the horn of the vehicle.

The upper end of the steering shaft 10 is carried on a bearing assembly 15 that is supported in a stationary support structure 16 secured to the upper end of the steering mast 11. The steering mast 11 is secured to the vehicle in any conventional manner.

The bearing assembly 15 consists of an electrical insulating sleeve 20 in the form of an annulus that has a central cavity 21. An outer bearing race 22 is placed in the cavity 21 with the anti-friction bearings 23 being placed between the bearing race 22 and the inner bearing race 24 that supports the steering shaft 10.

The insulating sleeve 20 has a radial shoulder 25 that rests upon the annulus 17 of the support structure 16 whereby to position the bearing structure 15 within the support structure 16.

The insulating sleeve 20 has a plurality of recesses 26, 27 and 28 at least one of which, such as the recess 28, extends through the cylindrical wall of the sleeve 20 from end to end thereof. The opening 28 passes through a sleeve extension 29 that receives the conductor wire and terminal in a manner hereinafter described.

A contact ring 30 is placed on the upper end of the insulating sleeve 20 to form a broad contact surface that is engaged by the sliding contact 31 carried in the steering wheel by which electric current is conducted to the horn button assembly 13. The contact ring 30 has a series of tangs 32 extending substantially normal to the face of the ring 30. These tangs have bars 33 projecting from opposite sides of the edges of the tangs so that when the tangs 32 are inserted into the recesses 26, 27 and 28, the barbs 33 dig into the wall of the respective recesses and thereby lock the contact ring 30 on the insulating sleeve 20.

At least one of the tangs 32, and preferably the tang that fits into the opening 28, has an opening 34. This opening 34 is disposed within the opening 28 below the level or the top of the sleeve 20.

To conduct electric current to the contact ring 30, an electrical conductor 35 is provided. This conductor 35 has the usual electrical insulating sheath to cover the wire core.

A terminal 36 is secured on the end of the conductor 35 with the portion 36a enclosing the electrical insulating sheath and the portion 36b secured to the bare conductor wire. The terminal 36 has an extending end portion 37. The terminus end of the portion 37 is bent back on itself to form a hook 38. The hook 38 engages the opening 34 in the tang 32 whereby the conductor wire 35 is prevented from being withdrawn from engagement with the tang after the terminal has once been inserted into its position with the hook disposed in the opening 34.

The terminal 36 also has a raised portion or lug 40 immediately adjacent the hook 38. This lug 40 engages the face of the tang 32 below the opening 34 to make electrical contact with the tang and thereby provide for conduction of electric current to the contact ring 30.

The cross sectional area of the opening 28 in the upper portion of the sleeve 20 is not substantially greater than the double thickness of the terminal end portion 37 and the tang 32 so that when the terminal end portion is in position in engagement with the tang, the lug 40 will be forced into engagement with the tang since the free clearance in the opening 28 is just sufficient to provide for effective contact of the lug 40 with the tang.

The lower end portion of the opening 28 is enlarged from the upper end portion to receive the terminal portions 36a and 36b whereby the entire terminal 36 is wholly insulated from contact with the steering mast by the electrical insulating sleeve 20.

The structural arrangement of the terminal engagement with the contact ring is one which provides for easy assembly of the contact ring 30 onto the sleeve 20 and thereafter insertion of the terminal 36 into the opening 28 to lock the terminal onto the tang 32 of the contact ring.

While the form of embodiment of the invention as herein disclosed constitutes a preferred form, it is to be understood that other forms might be adopted as may come within the scope of the claims which follow.

What is claimed is as follows:

1. A contact ring and electrical conductor assembly in the steering mast of a motor vehicle, comprising in combination, a cylindrical sleeve wall of electrical insulating material supporting a steering shaft bearing, an annular contact ring on one end of said sleeve, said sleeve wall having an opening through the same axial of the sleeve, said contact ring having a flat tang extending into said wall opening and frictionally engaging the wall by the edges of the tang to lock said ring on said sleeve, said tang having an opening therein, an electrical conductor wire having an insulating sheath and having a terminal on one end of the wire comprising a ferrule portion securing the terminal to the wire and a flat portion projecting longitudinally forward of the ferrule portion, said terminal having a hook at the terminus end of the terminal in the said flat portion and directed toward said ferrule portion and also having a raised portion adjacent the hook and positioned between the hook and the ferrule portion and extending outwardly from the flat portion of the terminal on the same side as said hook, said terminal being positioned in said wall opening with the said flat portion in face to face relation with said flat tang with said hook in said tang opening to lock said terminal on said tang against withdrawal of the terminal from engagement with said tang and with said raised portion engaging the face of said flat tang to effect electrical contact therewith.

2. A contact ring and electrical conductor assembly in the steering mast of a motor vehicle, comprising in combination, a cylindrical sleeve wall of electrical insulating material supporting a steering shaft bearing, an annular contact ring on one end of said sleeve, said sleeve wall having an opening through the same axial of the sleeve, said contact ring having a flat tang extending into said wall opening and frictionally engaging the wall by the edges of the tang to lock said ring on said sleeve, said tang having an opening therein, an electrical conductor wire having an insulating sheath and having a terminal on one end of the wire comprising a ferrule portion securing the terminal to the wire and a flat portion projecting longitudinally forward of the ferrule portion, said flat portion of said terminal having the forward end thereof bent backwardly on itself with the terminus end of the backwardly bent portion being disposed angularly outwardly away from the flat portion of the terminal and directed toward said ferrule portion whereby to form an open-ended hook with the open end of the hook disposed in the direction toward said ferrule portion, said flat portion of said terminal also having a raised portion adjacent the said hook and disposed between the said hook and the said ferrule portion and extending outwardly from the said flat portion of the terminal on the same side of said hook, said terminal being positioned in said wall opening with one side of the said flat portion in substantial engagement with the wall of said opening and the opposite side of the said flat portion of the terminal in face to face relation with said flat tang and with said hook in said tang opening to lock said terminal on said tang against withdrawal of the terminal from engagement with said tang and with said raised portion urged against said tang by engagement of the flat portion with said wall of said opening in said sleeve.

3. A contact ring and electrical conductor assembly in the steering mast of a motor vehicle, comprising in combination, a cylindrical sleeve wall of electrical insulating material supporting a steering shaft bearing, said sleeve wall having one or more openings through the same axial of the sleeve and disposed around the periphery of the wall, an annular contact ring on one end of said sleeve and having one or more flat tangs extending substantially normal to said ring with the tangs in said openings and in edge engagement with the walls of the opening to lock said ring on said sleeve, at least one of said openings extending through said sleeve wall from end to end, said one opening having the cross sectional area thereof in a portion receiving the tang of not substantially greater thickness than the thickness of said tang and of a flat terminal end disposed in said opening in face to face relation with said tang whereby to provide for placing of a terminal end in the said opening in engagement with said tang as held therein between the wall of said opening and said tang, said tang having an opening therein, an electrical conductor wire having an insulating sheath and having a terminal on one end of the wire comprising a ferrule portion securing the terminal to the wire and a flat portion projecting longitudinally forward of the ferrule portion, said flat portion of said terminal having the end portion thereof bent backwardly on itself with the terminus end of the backwardly bent portion disposed angularly outwardly from the flat portion of the terminal whereby to form an open ended hook with the open end disposed in the direction of said ferrule, said flat portion of said terminal also having a raised portion adjacent the said hook and disposed between the said hook and said ferrule portion and projecting from the flat portion of the terminal on the same side of said hook, said flat portion of said terminal being disposed in said opening in said sleeve in face to face relation with said flat tang with the return bend portion having the end thereof disposed within said tang opening to lock said terminal on said tang and with the raised portion of the terminal engaging said tang as held in engagement therewith by engagement of said flat portion with said terminal with the wall of said opening toward said raised portion against said tang, said hook being adapted to be spread open when said conductor wire has force applied thereto tending to pull said terminal out of said opening.

References Cited in the file of this patent

UNITED STATES PATENTS

| | | |
|---|---|---|
| 2,133,472 | Parker | Oct. 18, 1938 |
| 2,221,409 | Phelps et al. | Nov. 12, 1940 |
| 2,237,055 | Little | Apr. 1, 1941 |
| 2,640,970 | Falge et al. | June 2, 1943 |
| 2,747,170 | Batcheller | May 22, 1956 |